(12) United States Patent
Wang et al.

(10) Patent No.: US 8,868,735 B2
(45) Date of Patent: Oct. 21, 2014

(54) WIDE AREA NETWORK OPTIMIZATION

(75) Inventors: Wenyi Wang, Cupertino, CA (US); Juiping Liao, San Jose, CA (US); Rong Wang, Cupertino, CA (US); Duanpei Wu, San Jose, CA (US); Shih-cheng Yang, Saratoga, CA (US); Jing Hu, Goleta, CA (US)

(73) Assignee: Cisco Technology, Inc., San Jose, CA (US)

( * ) Notice: Subject to any disclaimer, the term of this patent is extended or adjusted under 35 U.S.C. 154(b) by 82 days.

(21) Appl. No.: 13/365,122

(22) Filed: Feb. 2, 2012

(65) Prior Publication Data

US 2013/0205002 A1 Aug. 8, 2013

(51) Int. Cl.
*G06F 15/173* (2006.01)
(52) U.S. Cl.
USPC ............................ 709/224; 709/225; 709/223
(58) Field of Classification Search
USPC ........................................................ 709/224
See application file for complete search history.

(56) References Cited

U.S. PATENT DOCUMENTS

| 6,989,856 | B2 | 1/2006 | Firestone et al. | |
|---|---|---|---|---|
| 7,084,898 | B1 | 8/2006 | Firestone et al. | |
| 7,321,384 | B1 | 1/2008 | Wu et al. | |
| 7,564,381 | B1 | 7/2009 | Asawa et al. | |
| 7,590,070 | B1 | 9/2009 | Asawa et al. | |
| 7,668,966 | B2 * | 2/2010 | Klinker et al. | 709/232 |
| 8,289,845 | B1 * | 10/2012 | Baldonado et al. | 370/230 |
| 2002/0078223 | A1 * | 6/2002 | Baldonado et al. | 709/232 |
| 2006/0182034 | A1 * | 8/2006 | Klinker et al. | 370/238 |
| 2007/0047446 | A1 * | 3/2007 | Dalal et al. | 370/237 |
| 2007/0064715 | A1 * | 3/2007 | Lloyd et al. | 370/401 |
| 2008/0159159 | A1 * | 7/2008 | Weinman | 370/252 |
| 2009/0129405 | A1 * | 5/2009 | Lauwers et al. | 370/468 |
| 2009/0154483 | A1 * | 6/2009 | Qu | 370/412 |
| 2010/0211673 | A1 * | 8/2010 | Kosbab et al. | 709/224 |
| 2011/0153721 | A1 * | 6/2011 | Agarwal et al. | 709/203 |
| 2012/0069744 | A1 * | 3/2012 | Krzanowski et al. | 370/252 |

OTHER PUBLICATIONS

S. Wenger et al., IETF RC 5104, "Codec Control Messages in the RTP Audio-Visual Profile with Feedback (AVPF)", Feb. 2008.

* cited by examiner

*Primary Examiner* — Douglas W Owens
*Assistant Examiner* — Monica C King
(74) *Attorney, Agent, or Firm* — Cindy Kaplan

(57) ABSTRACT

In one embodiment, a method includes receiving application traffic at a network device from one or more endpoints, measuring performance of applications at the network device, optimizing TCP (Transmission Control Protocol) applications and UDP (User Datagram Protocol) applications based on the measured performance and policy input received at the network device, queuing the application traffic at the network device such that the application traffic shares available bandwidth in accordance with the measured performance and the policy input, and transmitting the application traffic over a wide area network. An apparatus is also disclosed.

18 Claims, 4 Drawing Sheets

WIDE AREA NETWORK OPTIMIZATION

TECHNICAL FIELD

The present disclosure relates generally to communication networks, and more particularly, to wide area network optimization.

BACKGROUND

Wide Area Network (WAN) connections are used by many applications, including for example, TCP (Transmission Control Protocol) based business critical applications, productivity tools, conference systems, video applications, and other non-business applications. Cloud computing and information technology outsourcing drive the demand for more bandwidth while video consumes a significant percentage of bandwidth. Optimizing the wide area network can accelerate application performance and increase throughput levels. Conventional WAN optimization involves complex, fragmented, and hard to maintain components. The optimization components are installed on multiple devices which need to be deployed and designed into the network, and do not address UDP-based real-time application optimization.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
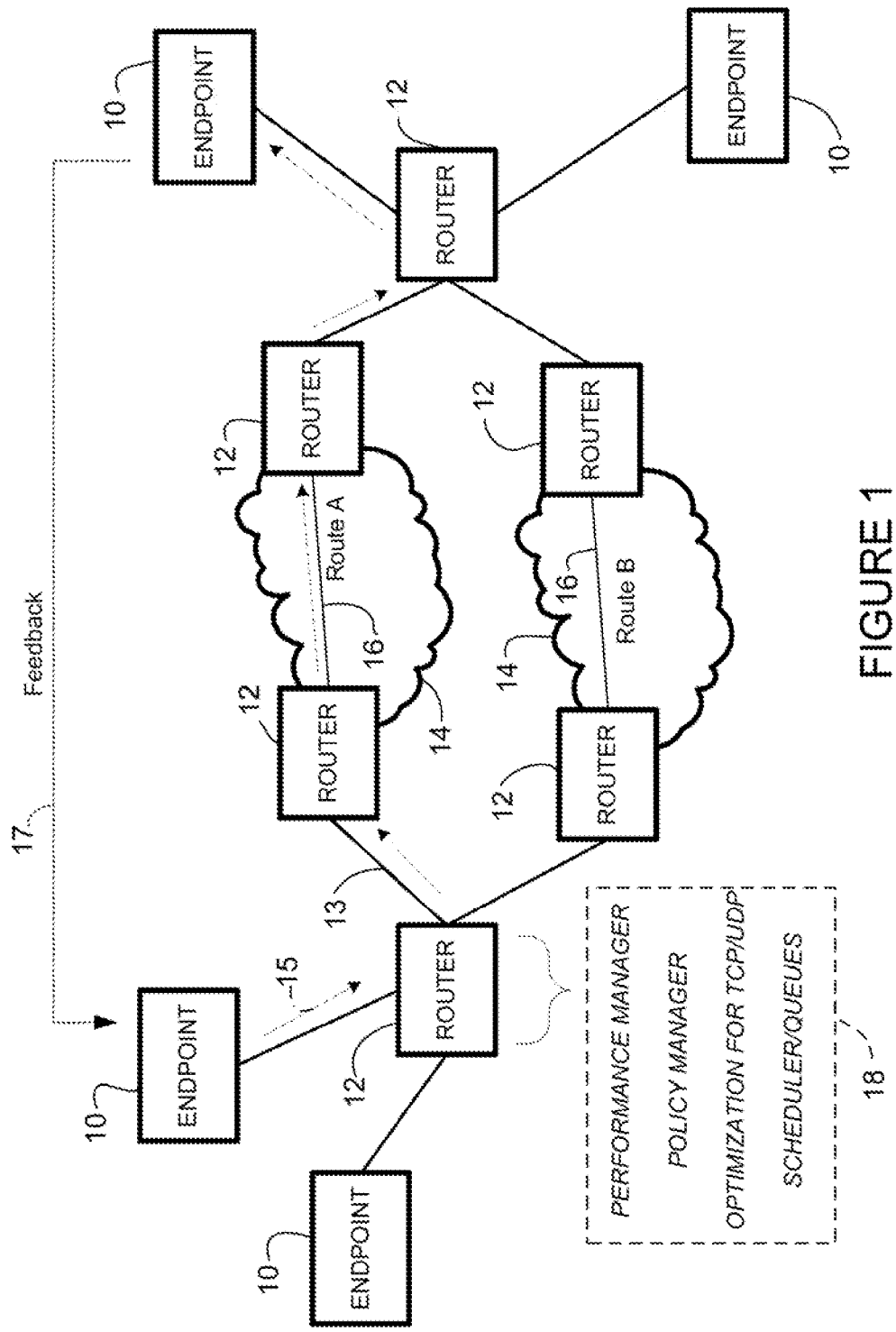
FIG. 1 illustrates an example of a network in which embodiments described herein may be implemented.

In one embodiment, a method generally comprises receiving application traffic at a network device from one or more endpoints, measuring performance of applications at the network device, optimizing TCP (Transmission Control Protocol) applications and UDP (User Datagram Protocol) applications based on the measured performance and policy input received at the network device, queuing the application traffic at the network device such that the application traffic shares available bandwidth in accordance with the measured performance and the policy input, and transmitting the application traffic over a wide area network.

In another embodiment, an apparatus generally comprises a performance manager for measuring application performance for application traffic received at the apparatus, a UDP optimizer for optimizing UDP applications, a TCP optimizer for optimizing TCP applications, a policy manager for processing policy input received at the apparatus, and a plurality of queues for queuing the application traffic received at the apparatus based on input from the performance manager and policy manager. The application traffic shares available bandwidth in a wide area network in accordance with the measured performance and policy input.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Multi-tiered services operate over WANs (Wide Area Networks) and many applications share bandwidth on the network. These include, for example, unmanaged applications (e.g., Internet streaming, Internet VoIP (Voice over Internet Protocol)), video applications (e.g., IP video conference, surveillance, video telephony, HD (High Definition) video conference), voice applications (e.g., IP Telephony), and data applications (e.g., application sharing, Internet, messaging, e-mail). When deploying video applications on wide area network links that are usually oversubscribed and overloaded, business critical applications compete against lower priority traffic and video applications for bandwidth. Because both TCP (Transmission Control Protocol) and UDP (User Datagram Protocol) run over the same network, an increase in UDP traffic in conventional systems impacts the performance of applications using TCP. Conventional systems used to deploy video applications do not monitor and optimize the performance of each application. Business productivity applications may be impacted by non-critical traffic without any visibility and protection. Also, unused bandwidth in one queue may not be used by other queues automatically and effectively, which results in inefficiency of a dedicated queue. Conventional systems do not automatically react in real-time to the bandwidth demand needed to maintain satisfied user experience.

WAN Optimization System

The embodiments described herein provide a complete solution to effectively integrate all optimization features to minimize deployment cost and provide additional features and value to users. As described in detail below, the embodiments manage business critical applications, real time voice/video, and best effort traffic automatically and effectively. The embodiments provide for efficient use of network resources for TCP traffic and UDP traffic including real-time communications and non-real-time streaming. The embodiments may be used, for example, to effectively optimize UDP-based real-time conversational UC&C (Unified Communications and Collaboration) applications. Different types of application traffic contending the WAN bandwidth are managed together and a system-level and network-level architecture for a complete solution is provided. This allows for pervasive video deployment, management of application performance requirements, and effective delivery of quality of services to networked applications and users. As described below, WAN optimization system components may be embedded in a network device such as a router, therefore eliminating the need for additional network devices. The WAN optimization system components may operate at a branch office, data center, or Internet edge, thus eliminating the need for different solutions for different network locations.

In one embodiment, the optimization system uses intent of an operator and intelligence that is relevant in the life cycle of a network operation. For example, the operator may express his intent (e.g., 'deploy the video endpoints in certain network locations') in an intent language, which is formalized and machine readable. The intent may be input as a policy at a policy manager. A network management portal may provide a user interface for a network administrator to use in specifying intent. Management portal software may than be used to translate the intent to configuration and policy that devices in the network follow through implementation by the optimization system. Once the intent is received, the network automatically processes the intent with built-in intelligence. For example, the relevant parts of the network automatically adjust to support the video sessions while it still supports other applications (e.g., VoIP, database, e-mail, etc.) with reasonable performance.

As described in detail below, the intelligence includes auto-diagnostics (performance management), configuration management (optimization and scheduling), and policy management. Auto-diagnostics comprises a range of self-discovery, awareness, and analysis capabilities that provide the system with a view on high-level state. This represents subsystems that gather, analyze, and report on internal and external states and conditions. For example, router throughput, WAN bandwidth utilization, video quality, audio quality, and application performance may be monitored and reported to network administrators. Configuration management is used to control network elements and interfaces. In addition to configuration, the network elements use information from auto-diagnostics to self-adjust and self-heal when certain network failures or application performance problems occur. Policy management is used to define network and application performance objectives and constraints. The subsystems interoperate with one another to automatically provide WAN optimization.

The system may be configured to allow for manual override of automated functions. For example, the WAN bandwidth intelligence described herein may be built on top of layer 3 router feature framework (e.g., C3PL (Cisco Common Classification and Policy Language) and CBWFQ (Class-Based Weighted Fair Queuing)). When the system is turned off, it is preferably compatible with conventional router framework.

Network-Level Architecture

The embodiments described herein operate in the context of a data communication system including multiple network elements. Referring now to the drawings, and first to FIG. 1, an example of a network in which embodiments described herein may be implemented is shown. The communication system comprises a plurality of endpoints 10 in communication through a plurality of network devices (e.g., routers) 12 and over networks 14. The communication system may include any number of networks (e.g., local area network, metropolitan area network, wide area network, enterprise network, Internet, intranet, radio access network, public switched network, or any other network or combination of networks). The flow path between the endpoints 10 may include any number or type of intermediate nodes (e.g., routers, switches, gateways, management stations, appliances, or other network devices), which facilitate passage of data between the endpoints. Also, there may be any number of endpoints 10. The endpoints 10 may be located at a branch office, for example, and in communication with an ISR (Integrated Services Router) 12 connected to a WAN access link 13. The ISRs may be in communication with ASRs (Aggregated Services Router) 12 operating at the network edge, for example. The routers 12 communicate over a wide area network.

The communication system shown in FIG. 1 includes two routes (Route A, Route B). One route may be a primary path and the other a backup path for use in the case of a failure or congestion in the primary path, for example. Traffic may also be distributed over both paths to provide additional bandwidth. In one or more embodiments, performance routing may be used to select the best path based on user defined policies. For example, critical applications may be routed on a primary link for best SLA (Service Level Agreement). Backup links may be used for best effort applications or in the case of performance degradation.

The endpoints 10 are configured to originate or terminate communications over the network. The endpoints 10 may be any device or combination of devices configured for receiving, transmitting, or receiving and transmitting traffic. As described below, the network device 12 receives application traffic from one or more endpoints. This includes, for example, receiving traffic from one or more upstream network devices. Traffic may include audio, video, text, or other data or combination thereof. The endpoint 10 may be, for example, a server that stores media locally or receives the media from another server or media source via another network, satellite, cable, or any other communication device. The endpoint 10 may also be, for example, a personal computer, set-top box, personal digital assistant (PDA), VoIP phone, tablet, Internet connected television, cellular telephone, TelePresence device, media center device, or any other network device that receives or transmits packets. As described below, the endpoints 10 may be configured for FEC (Forward Error Correction), rate-adaptation, error concealment, RTCP (Real-time Transport Control Protocol) feedback or other protocols or technologies.

The network device 12 may be, for example, a router (e.g., ISR, ASR), integrated router/switch, or any other network device configured for routing traffic. The router 12 may be an Internet-edge router in communication with an access switch or located at a branch office or data center, for example. The router 12 may be configured to enforce network policies, TCP throttling, provide network assessment/feedback, shape traffic (e.g., up/down speed, intelligent dropping), dynamically adjust queue bandwidth, or provide differentiated services, for example. The router 12 may also be operable to detect a performance issue, network status change (up or down), switch route, or perform preemption. In one or more embodiments, the router 12 is configured for Performance Routing (PfR), which is used to select a next hop to deliver the application traffic based on application performance measurement results and network resource status.

As described in detail below, a WAN optimization system 18 may operate at one or more of the network devices 12. In one embodiment, the optimization system 18 includes a performance manager, policy manager; optimizer, and scheduler, which are described below with respect to FIG. 3.

The optimization system 18 provides output to other nodes 12 configured for WAN optimization and endpoints 10. In one example, one of the endpoints (source) 10 transmits traffic (e.g., media stream) to another endpoint (receiver) as indicated at path 15 in FIG. 1. The receiver provides feedback to the optimization system 18 installed at one or more of the routers 12, which provide feedback 17 to the source 10. The endpoints 10 may include a feedback mechanism for endpoint-based rate-adaptation for UDP-based video applications, RTCP (Real-time Transport Control Protocol) receiver reports, or feedback such as described in IETF RFC 5104 ("Codec Control Messages in the RTP Audio-Visual Profile with Feedback", S. Wenger et al., February 2008), for example. The endpoint 10 may be configuied to adjust its transmitting bit-rate when feedback from the optimization system 18 indicates available bandwidth. For adaptive bit-rate based streaming protocol, no explicit feedback is needed, however, the system 18 may filter out or suppress higher bit-rate requests from clients to effectively manage the bandwidth adaption mechanism on streaming clients. Also, PCN (Pre-Congestion Notification)/ECN (Explicit Congestion Notification) markings may be used to signal network congestion status to the routers 12.

Nodes 12 configured with the optimization system 18 are preferably operable to automatically discover other nodes configured with the optimization system on the media path. Notifications and requests may be sent among these discovered optimization system devices 12 to effectively manage the media traffic bandwidth and to optimize the media application performance. The received notifications or requests from adjacent optimization system devices (upstream and downstream devices along the media path) can generate additional requests or notifications to other components (e.g., service routing, optimizer, policy manager, scheduler). The nodes 12 may use RSVP (Resource Reservation Protocol) for communication with one another, for example.

In one example, routers 12 at the ends of WAN link 16 comprise the optimization system 18. An RTP (Real-time Transport Protocol) trunk may be used between two adjacent optimization system devices 12 on a media path. For example, as shown in FIG. 1, the RTP trunk may be between two optimization system devices 12 connected by WAN link 16 on which bandwidth optimization is needed. The RTP trunk is preferably configured to support one of more of the following features to reduce overhead, reduce redundant copies of streams, create a branch out RTP trunk, or carry additional flags or markings. For example, RTP header compression and session multiplexing may be used to reduce overhead. Data Redundancy Elimination (DRE) may be used with UDP-based real-time multimedia applications to reduce redundant copies of video/audio streams in a multiple point conference or live-streaming applications. In order to provide DRE, both WAN optimization devices 12 maintain a synchronization RTP payload cache. The RTP header may be preserved over the trunk and the payload may be encoded by an index in a cache buffer, for example.

The RTP trunk preferably allows a new optimization system device 12 to be inserted into the RTP trunk to create a branch out RTP trunk. This is not applicable to TCP-based applications since TCP is a connection oriented protocol. This feature enables the system to support multipoint sessions. In this case, the optimization system device on the branch out point aggregates the RTCP receiver report feedback before it forwards the receiver report to the upstream device. The same optimization device 12 can also replicate the RTCP sender report so that each receiver receives the sender report.

Special RTP header or padding byte(s) may be supported on the trunk to carry additional flags or markings. For example, the media content type and associated priority may be added to an RTP header extension. PCN/ECN flags may be added to the padding bytes or RTP header extension so that it does not require the network to support PCN/ECN for UDP traffic. Additional video content information obtained by application recognition (such as video content entropy index) may also be added to the padding bytes. This may be used by the downstream optimization system device's traffic policing and queuing to manage congestion effectively. Advanced RTCP extensions may also be supported.

Measured application performance (described below) may be used to generate feedback to endpoints 10 so that endpoints, can adapt to network conditions. For example, endpoints 10 configured for bit-rate adaptation may reduce their transmitting bit-rate when feedback indicates congestion and increase bit-rate when feedback indicates available bandwidth. Source endpoints 10 may receive feedback from the WAN optimization system 18 for use in determining how to change the bit-rate. For endpoints 10 not capable of changing bit-rate, their traffic can still be shaped at the router 12 based on DSCP (Differentiated Services Code Point) marking of the packets and other policies. Packets of less importance may be dropped by the router 12 when congestion occurs. Performance routing may be used to reroute a stream to avoid congestion. For example, one or more media streams may be moved from route A to route B to avoid congestion on route A (FIG. 1).

It is to be understood that the network shown in FIG. 1 is only an example and that the embodiments described herein may be implemented in networks having different network topologies and network devices, without departing from the scope of the embodiments.

Network Device

Figure 2:
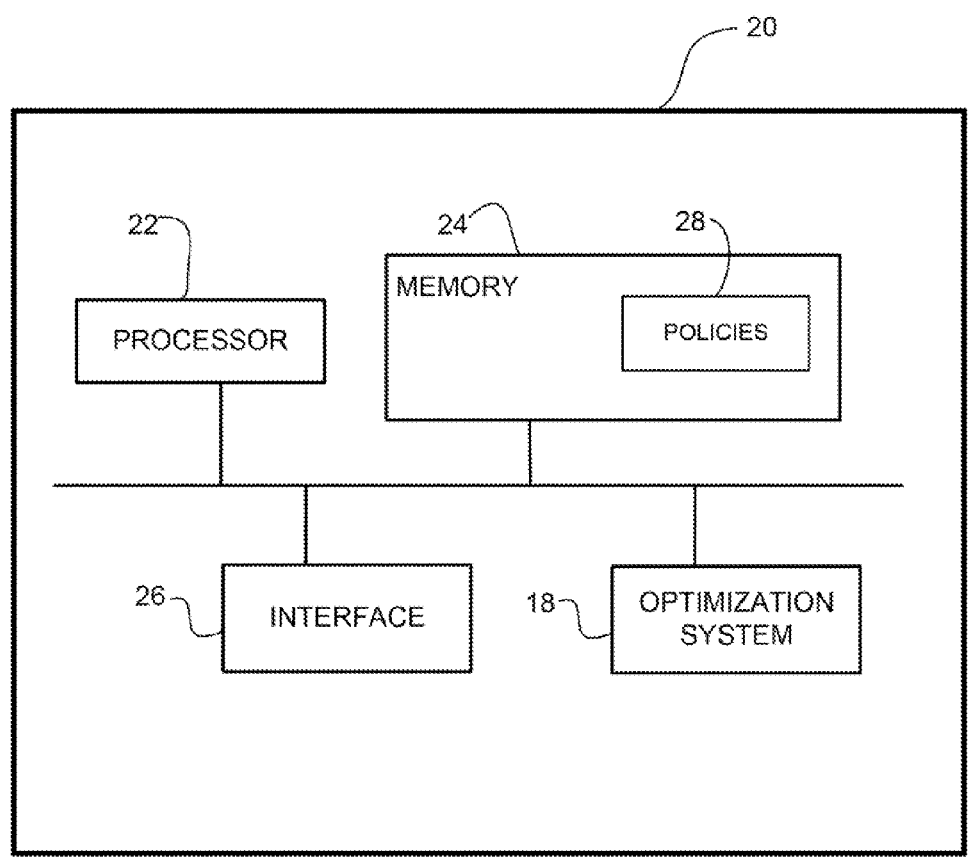
FIG. 2 depicts an example of a network device useful in implementing embodiments described herein.

An example of a network device (e.g., router) 20 that may be Used to implement embodiments described herein is shown in FIG. 2. In one embodiment, network device 20 is a programmable machine that may be implemented in hardware, software, or any combination thereof. The device 20 includes one or more processors 22, memory 24, and network interface 26. Memory 24 may be a volatile memory or non-volatile storage, which stores various applications, modules, and data for execution and use by the processor 22. For example, memory 24 may include policies 28, a flow/metadata database, and optimization system 18 components described below with respect to FIG. 3.

Logic may be encoded in one or more tangible computer readable media for execution by the processor 22. For example, the processor 22 may execute codes stored in a computer readable medium such as memory 24. The computer readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interface 26 may comprise one or more interfaces (linecards, ports) for receiving data or transmitting data to other devices. The interface 26 may include, for example, an Ethernet interface for connection to a computer or network.

It is to be understood that the network device 20 shown in FIG. 2 and described above is only an example and that network devices having different components and configurations may be used without departing from the scope of the embodiments. For example, the network device 20 may further include any suitable combination of hardware, software, algorithms, processors, DSPs (digital signal processors), devices, components, or elements operable to facilitate the capabilities described herein.

System-Level Architecture

Figure 3:
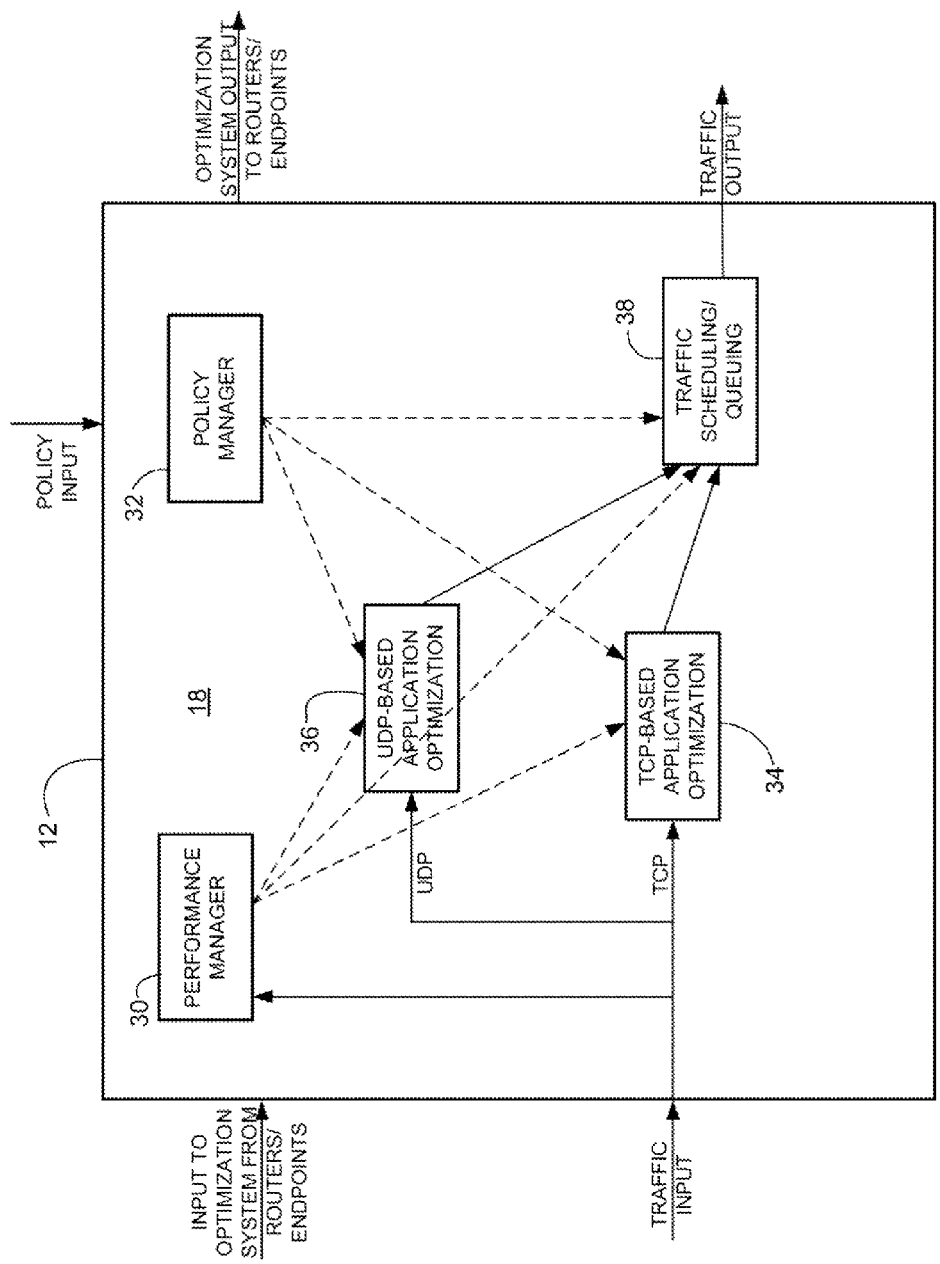
FIG. 3 illustrates an example of an integrated wide area network optimization system.

FIG. 3 illustrates an example of the WAN optimization system 18 at one of the optimization system devices 12. The system 18 includes a performance manager (APM (application performance manager)/VQM (video/voice quality manager)) 30, policy manager 32, TCP-based application optimization module 34, UDP-based application optimization module 36, and scheduling and queuing module 38. The node 12 receives input (signaling) to the optimization system 18 from other nodes (e.g., routers with optimization system installed, endpoints 10). The node 12 also sends optimization system output to other routers and endpoints 10. Policy input is provided to the node 12 from an external policy source, as described below. The input may be received from downstream and upstream devices and the output may be transmitted to downstream and upstream devices.

The performance manager 30 is configured to measure the application performance and compare the performance against a performance baseline requirement (e.g., Service Level Objective (SLO), Service Level Agreement (SLA), policies). For example, the performance manager 30 may monitor application performance and measure the deviation between SLA and application performance. Performance is measured for voice, video, and other critical applications. The results are sent to the optimization modules 34, 36, and scheduler 38.

The performance manager 30 may receive input from an application recognition mechanism (not shown). Application recognition features such as Cisco NBAR2 (Network Based Application Recognition 2) and MSP (Media Service Proxy) may be used to recognize networked applications. SIP/H.323/RTSP signaling protocols may also provide a means to recognize a media flow. Other input such as Cisco FnF (Flexible NetFlow) and RSVPimetadata signaling protocols may be used to aid in application recognition. An application ID or CAC (Call Admission Control) ID that is carried by RSVP/metadata may provide additional information about the flow. The metadata may also provide, for example, bandwidth reservation (admitted or un-admitted status), application user ID, codec type (e.g., H.264 AVC, H.264 SVC, H.263, MPEG-2, etc.), maximum bandwidth (TIAS (Transport Independent Application Specific)), and minimum admitted bandwidth (for H.264: profile and level, RTP protocol and restrictions), and endpoint device capabilities (rate-adaption, Cisco Flux version supported by endpoint). The media stream may also be identified, for example, using a form of DPI (Deep Packet Inspection) or configured IP 5-tuples defining the stream. Flow information may be stored in a flow/metadata database (not shown). The flow/metadata database may be distributed to other nodes 12 incorporating the WAN optimization system.

Output from the performance manager 30 may be used by the media optimization module 36 to determine if up-speed or down-speed is needed. A video quality reader may be used to calculate a video quality score and provide video quality analysis, for example. The video quality score is compared to a target video quality score that is assigned to a video stream as part of policy or service level agreement. Information from NBAR2 or MSP-generated metadata may be used to identify the video stream and find the respective policy or service level agreement. As described below, the media optimization module 36 may use this information to provide feedback. In response to a positive quality delta (i.e., higher than target), a message is sent to the source or upstream devices to slow down. A negative delta (i.e., lower quality than target) results in feedback to the source endpoint or upstream devices to speed up.

The policy manager 32 receives input from a policy server configured to receive policy information from a network administrator, for example. The policies are set up to manage application performance and resource allocations. For example, location service and service announcements may be provided for local endpoints. Policy is set up based on SLA, target performance, bit-rate, etc. Priorities are set up to meet business needs (e.g., HD used for business is more important than regular desktop HD phone calls). The policy server may include an external network policy manager that allows the network administrator to specify application classes, performance baselines per class, bandwidth usage rules, and per user SLO/SLA, etc. The policy is provisioned on all network devices 12 that incorporate the WAN optimization system 18 and may be implemented by a network management system (NMS), for example.

The policy manager 32 includes a network policy enforcement engine for processing policy input received at the network device 12 and managing the application delivery and performance assurance. The engine uses bandwidth pools and bandwidth usage rules defined by the policy manager to manage and provide feedback to the other components of the optimization system 18. As shown in FIG. 3, the policy manager 32 provides input to the optimization modules 34, 36, and scheduler 38.

In one embodiment, the optimizer comprises two components; the TCP-based application optimization module 34 and the UDP-based application optimization module 36. The optimization modules 34, 36 receive input from the performance manager 30 and policy manager 32 to dynamically adjust the mapping of applications to queues 38 and optionally drop media packets intelligently. Voice, video, and mission critical applications are protected to provide optimum application performance and user experience. For example, one or more of the applications may be mapped to priority queues to protect critical applications.

The TCP-based application optimization module 34 is configured to optimize all TCP-based applications (also referred to herein as TCP applications), including streaming video and audio. In one embodiment, the optimization module 34 is a Cisco WAAS (Wide Area Application Services) module. The optimization module 34 may request additional bandwidth from the scheduler 38 to meet application performance baseline requirements, for example. The scheduler 38 may proactively throttle the TCP output to yield more bandwidth to higher priority UDP-based video applications that are managed by the media optimization module 36, based on policy and performance baselines.

The UDP-based application optimization module 36 (also referred to as a multi-media application optimization service module (MMOS) or media optimization module) optimizes UDP-based applications (also referred to herein as UDP applications) such as video and audio applications, including, for example, conferences and other non-business real-time multi-media applications (e.g., live-streaming video), etc. The media optimization module 36 is configured to provide a balance between quality and bandwidth consumption. The module 36 may request additional bandwidth from the scheduler 38 to meet application performance baseline requirements. The scheduler 38 may proactively reduce the video bandwidth to yield more bandwidth to higher priority TCP applications managed by the TCP-based application optimization module 34 based on policy and performance baselines. Since UDP does not have explicit flow-control mechanisms, the scheduler 38 or policy manager 32 may send messages to the media optimization module 36 to signal bandwidth.

The goal of media optimization, especially for real-time interactive video is to optimize the video quality and maximize ROI (Return on Investment) of WAN bandwidth. The ROI of WAN bandwidth may be maximized by increasing the number of concurrent video sessions over the existing WAN, prioritizing the bandwidth offering to sessions to gain the most business value out of bits and bytes sent over the WAN link, and effectively managing congestion to minimize quality impact when packets are discarded. Examples of media optimization mechanisms that may be used by the optimization system 18 are described below.

In one embodiment, the traffic scheduling and queuing module 38 comprises HQF (Hierarchical Queuing Framework) based queuing and output scheduling. HQF provides policing; shaping and queuing capabilities and includes a logical engine to support QoS features. In one example, the HQF hierarchy is a tree structure that is built using policy maps. When data passes through an interface using HQF, the data is classified so that it traverses branches of the tree. Data arrives at the top of the tree and is classified on one of the leaves. Data then traverses down the hierarchy (tree) until it is transmitted out the interface at the root (trunk).

The queuing and output scheduling 38 operates on the network interface. The application performance baseline, the measured application performance index, and other parameters such as application priority, and bandwidth pool attributes for each category of traffic are used to schedule the application traffic delivery to provide maximized ROI of bandwidth and improved QoE (Quality of Experience).

In one embodiment, all of the components shown in FIG. 3 and described above are integrated in a network device (e.g., router 12). In another embodiment, one or more components operate as a standalone appliance. For example, the TCP-based application optimization module 34 may be a standalone appliance (e.g., WAAS appliance) and the media optimization module 36 may be deployed on the router 12 or as an integral part of the TCP-based application optimization appliance. As discussed above, all of the components are preferably implemented and deployed in the WAN access routers and network edge routers configured for operation as a WAN optimization system.

WAN Optimization Process

Figure 4:
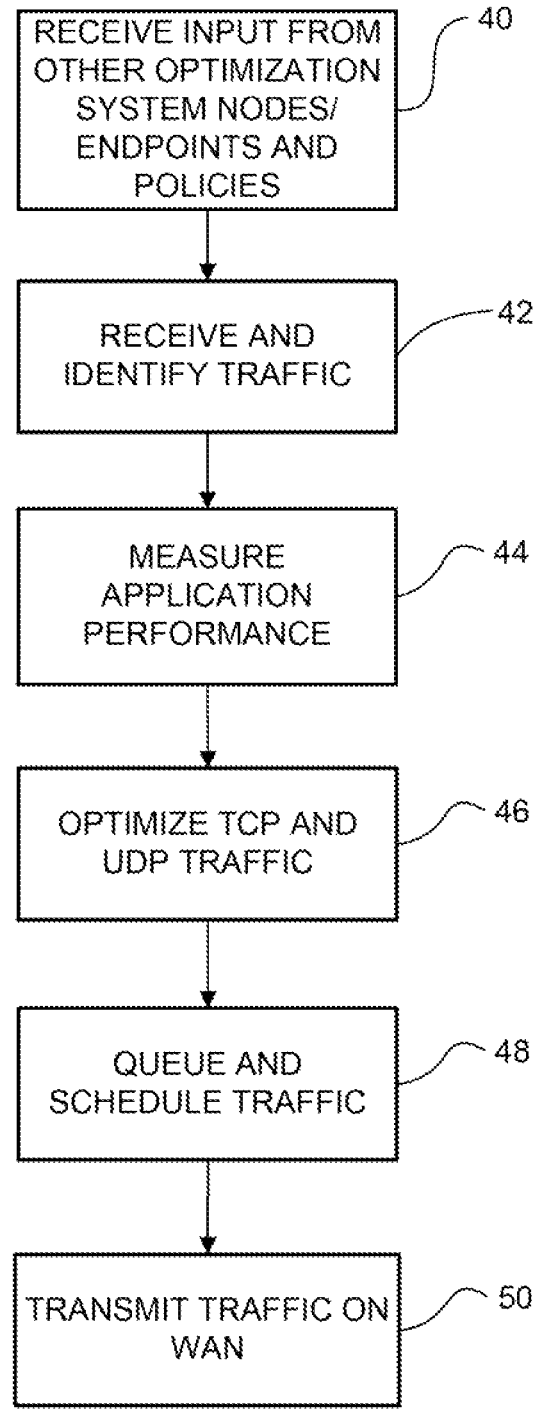
FIG. 4 is a flowchart illustrating an overview of a process for wide area network optimization, in accordance with one embodiment.

FIG. 4 is a flowchart illustrating an overview of a process for WAN optimization, in accordance with one embodiment. At step 40, the network device (e.g., router 12) receives policies and input from other WAN optimization system nodes and endpoints 10. The network device 12 identifies application traffic received from a plurality of endpoints 10 and associated with a plurality of applications (step 42). As described above, various methods may be used to recognize applications and identify flows. Flow information may be stored at the device 12. The performance manager 30 monitors the input traffic and measures the application performance at the network device 12 (step 44). As previously described, the application performance may be compared against baseline performance requirements. The router optimizes TCP and UDP traffic based on the measured performance and policy input (step 46). The traffic is queued at the network device (step 48) and transmitted from the network device 12 over the wide area network (step 50). The application traffic (for UDP and TCP applications) share available WAN bandwidth in accordance with the measured performance and policy input.

It is to be understood that the process illustrated in FIG. 4 and described above is only an example and that steps may be modified, added, removed, or combined, without departing from the scope of the embodiments.

Optimization of Real-Time Media Applications

The following describes examples for optimization techniques for real-time media applications. In one embodiment, video optimization is about adjusting the bandwidth consumed by it to adjust the video quality. Video bandwidth consumption can be changed by altering the video format. Upon congestion, bandwidth efficiency is optimized by balancing between bandwidth and quality, and by providing more bandwidth for higher priority video flows so that these flows provide higher quality media.

The variable bit-rate nature of video traffic allows statistical multiplexing to support more sessions with given network bandwidth and QoS policy. Real-time conversational video applications do not tolerate extra buffering and delay, therefore, one-way delay should preferably be no more than 250 ms. Congestion management/control may be used to improve and maximize video quality. When congestion occurs, policing rules are enforced and network-based feedback is provided to applications to reduce application traffic in order to reduce or eliminate congestion. Bandwidth efficiency may be improved by supporting more sessions without extra delay and buffer resources. This can be achieved by supporting statistical multiplexing and over-subscription of bandwidth.

Rate-adaptive media encoders (e.g., video and audio encoders) use network status information and receiver feedback to optimize the quality. Session prioritization and differential network services based on business priority and performance target (e.g., service level agreement) are supported to decide when to send feedback and what feedback is sent from network devices. For example, some applications may get more bandwidth while lower priority applications may be notified to reduce traffic.

The endpoint 10 may respond to the feedback by adjusting the quality of the video. For example, if the decompressed video quality is lower than a specified target, the endpoint 10 needs to use more bandwidth to improve the quality; the source endpoint shall preferably attempt to improve decompressed video quality by increasing resolution and frame rate. If compression degradation is large, the source may attempt to reduce compression degradation by increasing bits per pixel. If packet loss and delay distortion is large, the source may use techniques such as FEC (Forward Error Correction) to alleviate loss impact. Also, the upstream devices and router may increase priority and bandwidth assignment for the stream.

If decompressed video quality is higher than a specified target and the routers 12 want endpoint 10 to reduce the bandwidth consumption, the source endpoint 10 may attempt to reduce resolution and frame rate to reduce bandwidth consumption, for example. If compression degradation is small, the source may attempt to allow compression degradation by decreasing bits per pixel. If packet loss and delay distortion is small, the source may avoid using techniques such as FEC that use up bandwidth. Also, upstream devices 10 and routers 12 may decrease priority and bandwidth assignment for the stream.

Many installed endpoints are not rate-adaptive in response to network status changes (e.g., bandwidth changes, link-down, bandwidth preemption, congestion). Network based DSPs may be used as rate-adaption helpers for these non-adaptive endpoints to adapt to network conditions dynamically. As described below, the WAN optimization system 18 installed at the network device 12 may operate as a proxy for the endpoints 10 to implement rate-adaptation for one or more media streams.

The following are examples of mechanisms that may be used in the optimization of media applications.

In one embodiment, CAC (Call Admission Control) and flow policing is used to optimize media applications. CAC and flow policing may be used for on control path or when no explicit control path is involved. For on control path the control message/protocol is terminated or handled by the WAN optimization system 18. In one example, RSVP (Resource Reservation Protocol), which is used to reserve resources across the network, is used as the control protocol. The system checks the bandwidth and resource availability to decide whether the application traffic flow is admitted or rejected. For the case with no explicit control path involvement, the control message/protocol (for example, RTSP, H.323, SIP, HTTP, etc.) is not terminated or processed on the router 12. In this case, the system uses NBAR2, flow metadata information, etc., to extract information on the application flows. The system may, for example, sniff the SIP (Session Initiation Protocol), H.323, RTSP (Real-Time Streaming Protocol), HTTP (Hypertext Transfer Protocol) content, and the like, to extract information for the application flows. If there is insufficient bandwidth resource for the flow, the traffic flow is marked as best effort or unadmitted class. Appropriate feedback messages are sent to the source of the application traffic flow to regulate the bandwidth consumption by these flows (e.g., quench the traffic from source or lower the video bit rate to the minimum available bandwidth).

Both end-to-end on-path CAC and local interface on-path CAC are preferably supported so that the above two cases are covered. If RSVP is used by the application to check and reserve bandwidth, the system is able to admit or reject the application traffic flow. Some applications may still send traffic, even if CAC failed. The optimization system 18 is preferably configured so that these application flows are properly marked to protect the admitted application traffic flows. For example, the system may mark the application flows as best effort or unadmitted class.

The CAC mechanism preferably supports oversubscription by guaranteeing the minimum bandwidth that is defined per device type, application type, privilege level, or any combination thereof, and allowing applications (e.g., video endpoint encoder) to use more than minimum bandwidth up to a maximum bandwidth limitation, but without guarantee.

Another media optimization mechanism that the system may utilize is congestion control for variable bit-rate video applications. Congestion may occur, for example, when oversubscription occurs and applications generate more traffic than a network link can transport, when multiple video encoders send burst traffic onto the network, when there is no QoS provisioning or inappropriate QoS settings on router, or when network bandwidth changes mid-session. In these cases, the router has to drop packets if no buffer is available to store the excess traffic. Conversation video streams should not be buffered during congestion in order to minimize the delay and jitter. Techniques that may be used include video DPI (Deep Packet Inspection) and video specific application parsing (e.g., parse the H.264 RTP header and video payload) to extract video specification information from a flow or from multiple packets of the flow, such as priority, entropy of a packet or flow, video quality score, frame boundary, etc. Intelligent (selective) packet dropping to drop less important packets first or SVC (Scalable Video Coding) layer filtering and forwarding may also be used. Bandwidth and resource CAC may be used during session setup and mid-call (e.g., preemption, over-subscription/down speeding, resume/recover).

Differential feedback may also be used. In this case, not all of the endpoints receive equal notification from the network (e.g., PCN/ECN, RTCP feedback messages, or other notifications). Endpoints receive different feedback during network congestion or up-speeding when more bandwidth is available. For example, application performance based differentiation may be used so that streams experiencing lower quality can get more bandwidth to improve the quality. Priority based differentiation may also be used so that higher priority streams can get higher bandwidth (e.g., lower ECN/PCN marking ratio). If a load threshold is reached on the WAN link, the system may mark packets differentially to notify load/congestion. For example, only packets received from two of three sources may be marked. The receivers may provide feedback (e.g., RTCP receiver reports) 17 to the sources, as shown in FIG. 1. If the bandwidth usage on the WAN link falls below a load threshold, CAC may be used to provide up-speed of one or more traffic flows.

Smart on-line video trans-rating for non-adaptive source endpoints 10 and rogue (aggressive) endpoints may also be used. Video trans-rating converts a video stream to a lower bit-rate stream continuously. Congestion is detected and a trans-rater is inserted into media flow dynamically. The trans-rater is reclaimed when congestion is relieved. The bit-rate is dynamically adapted per the network/receiving endpoint feedback (e.g., trans-rater using RTCP feedback). The WAN optimization system 18 operates as a proxy for FEC insertion and removal. If the network segment is unreliable with persistent packet loss rate, FEC can be inserted before entering the network segment and after exiting from the network segment FEC is removed. The system 18 may also operate as a proxy for error resilience features. The system 18 operates as a proxy for the endpoints 10 that are non-adaptive to interoperate with adaptive endpoints.

Another media optimization mechanism is DRE (Data Redundancy Elimination) for UDP video/audio traffic. This can be applied for bandwidth reduction for conferences hosted by a Multipoint Control Unit (MCU) in campus or headquarters. If more than one copy of a media packet is sent over the WAN link, the system installed at an aggregated services router can effectively eliminate the redundancy and the system installed at an integrated services router can regenerate the streams for receiving endpoints in the same remote location. DRE may also be used for bandwidth reduction for conferences hosted by node on aggregated services router in which case the system installed at an aggregated services router can effectively eliminate the redundancy and the system installed at an integrated services router can regenerate the streams for receiving endpoints in the same remote location. DRE may be used for bandwidth reduction for conference hosted by a node in branch location or bandwidth reduction of UDP-based live media streams, for example. In these two examples, the system on an ISR can eliminate the redundancy and the system on the ASR can regenerate the streams.

In addition to the optimization techniques described above for UDP-based video applications, HTTP-based video recognition, video pacing, and per stream dynamic policy framework may be used to manage so-called over-the-top (OTT) streaming videos for enterprise networks.

Bandwidth Efficiency

As described above, the traffic scheduling and queuing module 38 may utilize HQF. The following describes one embodiment utilizing HQF with media and data queues. In one example the HQF includes voice queues, video queues, and default queues. For example, the video may account for 55-70% of the traffic, voice for 10-15%, and default 15-35%. In one embodiment, every application class uses minimum bandwidth to meet a performance baseline. Within each class, every application uses minimum bandwidth to meet the performance baseline defined in the profile. Applications with lower than configured or agreed performance index may get extra credit for more bandwidth to improve application performance and quality of user experience. The WAN bandwidth may be over-subscribed with the above two principles followed. Statistical multiplexing in HQF fully utilizes the variable bit-rate characteristics of video and application traffic to manage the application performance and bandwidth efficiency.

In one embodiment, each class has a minimum guaranteed bandwidth and maximum bandwidth limit, while bandwidth between minimum and maximum is not always guaranteed and may be reallocated by the router 12 dynamically to different classes. A best-effort class may, however, use all link bandwidth if other classes are idle. The total of maximum bandwidth may exceed the link bandwidth capacity. The sum of minimum bandwidth is usually less than the link bandwidth capacity. This bandwidth oversubscription with minimum guaranteed bandwidth is flexible for the HQF traffic scheduler to dynamically adjust the bandwidth within the range to optimize the application performance. A network administrator may specify the maximum and minimum of each class to meet certain business needs.

Several predefined application performance baseline profiles may be created. The network administrator may use a centralized policy manager to select the profile that fits into the networked application portfolios and targeted number of users in each branch. The selected profile is then downloaded to the routers. Different performance baseline profiles may be used for different times. For example, busy hour, normal hour, and night hour for backup may have different performance baseline profiles. In an application performance baseline profile, a mix of applications and performance target can be varied within a day, week, or month. For example, peak hour interval, normal hour interval, database backup schedule, etc. can be specified. Each category of traffic can have its own peak hour and normal hour definition.

The HQF uses currently selected policy and predefined performance baseline to manage the bandwidth resource and CPU power. Bandwidth allocation may be calculated for every predefined interval (e.g., every second or multiple seconds).

The first level sub-queues in HQF are determined by application class and priority. As noted above, there may be three classes of application traffic; voice, video, and a default class. Different classes can be created (e.g., voice, video, un-managed video, data application, and default class). Other classes that may be defined include VoIP Telephony, broadcast video, real-time interactive, multimedia conferencing, multimedia streaming, network control, call-signaling, OAM (Operations, Administration, and Maintenance), transaction data, bulk data, best-effort, and scavenger. HQF is configured to dynamically adjust the bandwidth pool in order to optimize the application performance by following the principles discussed above. Within the same application class and priority, each application will get their fair share of the bandwidth pool. In one example, the fair share is achieved by the rules defined below.

The following are examples of bandwidth sharing algorithms that may be used in the embodiments described herein.

Various formulas for calculating performance index can be selected by a network administrator to take into consideration the application performance attributes such ag user priority, transaction per second, maximum or minimum application traffic bandwidth, video bit-rate, minimum frame rate, minimum resolution, maximum delay and jitter threshold, packet loss rate, ECN/PCN ratio, audio MOS (Mean Opinion Score), video MOS, video content entropy value, etc. Each parameter may have its own weight or precedence to determine the performance index. Class level performance index is used for class level bandwidth fair share calculation while individual application performance index is used to calculate the application's fair share of per class bandwidth.

The performance index is calculated in a sliding window. The HQF calculates the deviation ($PerfD_i$) between performance baseline and actual performance index:

$$PerfD_i = Perf_i^{(p)} - Perf_i^{(a)}$$

where:
$Perf_i^{(p)}$ is the baseline in profile; and
$Perf_i^{(a)}$ is the average of performance index.

For example, if the $Perf^{(p)}$ is defined as 200 ms average delay, a measured $Perf^{(a)}$ of 220 ms means the application may need more bandwidth to improve the delay when excessive queuing length is observed.

Negative PerfD means that the application is receiving better service than expected. A larger positive value means more bandwidth should be assigned to the application. In the same application class with multiple application instances, per class PerfD is defined as the sum of all applications' PerfD in the same class. The sum of all PerfDs on a link ($\Sigma PerfD$) can be used to evaluate whether a link or bandwidth pool should be upgraded. The bigger the $\Sigma PerfD$, the more bandwidth needed.

The following algorithm may be used to adjust bandwidth of an application class or an individual application. If PerfD is negative, down-speed may be applied to the application (i.e., less bandwidth is available to the application). For UDP-based video application, this is achieved by down-speed notification, either by dropping less important packets so that the receiver will notify the sender by RTCP receiver report, or by marking PCN/ECN bit with higher ratio, for example. For TCP-based applications, the TCP output rate may be throttled (reduced) by traffic shaping mechanism in output queue. For all applications with positive non-zero PerfD, more bandwidth should be allocated to them. For UDP-based video applications, this can be achieved by up-speed notification, or lower ratio of PCN/ECN marked packets. For TCP-based applications, the buffer depth may be increased, and acknowledgement may be expedited.

For all applications, $BwNS_i$ denotes the normalized share of bandwidth where:

$$BwNS_i = (Bw_i^{(actual)} - Bw_i^{(min)})/(Bw_i^{(max)} - Bw_i^{(min)})$$

where:
$Bw^{(max)}$ is an upper limited bandwidth threshold;
$Bw^{(min)}$ is a guaranteed minimum bandwidth threshold; and
$Bw^{(actual)}$ is the actual bandwidth used by the application to achieve
$Perf^{(a)}$.

The fair share of bandwidth for application class is defined as:

$$BwFS_i = BwNS_i/W_i$$

where:
$W_i = Priority_i + PerfD_i$.
A larger priority value means higher priority.
If $W(i) > 2$, set $W(i) = 2$;
if $W(i) < 0.5$, set $W(i) = 0.5$
Then all application classes preferably have the same fair share BwFS to make PerfD=0. Within same class sharing the same bandwidth pool, $W_i = PerfD_i$.

Applications that have lower than average BwFS (underperform) should get extra credit where applications that have above average BwFS may be subject to down-speed (bandwidth reduction) feedback, high ratio of PCN/ECN marked packets, or TCP effective output throttling to yield to under-performing applications.

Extra bandwidth should be granted to under-performing applications to provide more bandwidth. The extra credit may be calculated as follows:

Let assignable bandwidth BwAvail=Link capacity−$\Sigma$ (min guaranteed bandwidth)

Let $Bw_i = BwAvail * (W_i/\Sigma W)$ $$Bw_i^t = \alpha*(Bw_i^{t-1}) + (1-\alpha)*(Bw_i - (BwFS_i*(Bw_i^{max} - Bw_i^{min})))$$

where:

$Bw_i^t$ is the amount of bandwidth to be adjusted for current time t;

α is between 0 and 1.0 and is used to smooth out transient burst; and $Bw_i$ is current and $Bw_i^{t-1}$ is the previous value.

It is to be understood that the bandwidth sharing algorithms described above are only examples and that other methods may be used to manage bandwidth without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
    receiving application traffic at a network device from one or more endpoints, the network device comprising a performance manager;
    measuring performance of applications at the performance manager;
    optimizing both TCP (Transmission Control Protocol) applications and UDP (User Datagram Protocol) applications based on said measured performance and policy input received at the network device;
    transmitting feedback to one or more of the endpoints based on said measured performance, said feedback configured for use by said one or more endpoints in adjusting the application traffic;
    queuing the application traffic at the network device such that the application traffic for both TCP and UDP applications shares available bandwidth in accordance with said measured performance and said policy input; and
    transmitting the application traffic over a wide area network.

2. The method of claim 1 wherein said endpoint is configured for rate-adaption of application traffic associated with one or more traffic flows transmitted from the endpoint and passing through the network device.

3. The method of claim 1 wherein optimizing the applications comprises performing rate adaptation as a proxy for one or more of the endpoints at the network device.

4. The method of claim 1 further comprising automatically discovering other network devices configured to optimize the TCP and UDP applications.

5. The method of claim 4 further comprising communicating with said one or more of said other network devices to manage bandwidth and optimize application performance over a media path in the wide area network.

6. The method of claim 1 wherein measuring performance comprises monitoring the performance of the applications and comparing the performance to performance baselines received in said policy input.

7. The method of claim 1 further comprising mapping one or more of the applications to priority queues at the network device to protect critical applications.

8. The method of claim 1 wherein optimizing the traffic comprises marking packets associated with a traffic flow to identify congestion.

9. The method of claim 1 wherein said policy input comprises bandwidth usage rules for the TCP and UDP applications.

10. The method of claim 1 wherein queuing the traffic comprises utilizing hierarchical queuing.

11. The method of claim 1 further comprising selecting a path to transmit the application traffic based on said measured performance and network resource status.

12. The method of claim 1 wherein measuring, optimizing, and queuing are performed on a router operating in the wide area network.

13. An apparatus comprising:
    a performance manager for measuring application performance for application traffic received at the apparatus;
    a UDP (User Datagram Protocol) optimizer for optimizing UDP applications;
    a TCP (Transmission Control Protocol) optimizer for optimizing TCP applications;
    a policy manager for processing policy input received at the apparatus; and
    a plurality of queues for queuing the application traffic received at the apparatus based on input from the performance manager and the policy manager;
    wherein the application traffic for both TCP and UDP applications shares available bandwidth in a wide area network in accordance with said measured performance and said policy input, and the apparatus is configured for transmitting feedback to one or more endpoints based on said measured performance, said feedback configured for use by said one or more endpoints in adjusting the application traffic.

14. The apparatus of claim 13 wherein the performance manager is configured for monitoring the performance of the applications and comparing the performance to performance baselines received in said policy input.

15. The apparatus of claim 13 wherein the apparatus is configured to map one or more of the applications to priority queues at the network device to protect critical applications.

16. The apparatus of claim 13 wherein the apparatus is configured to mark packets associated with a traffic flow to identify congestion.

17. The apparatus of claim 13 wherein said plurality of queues comprise a hierarchical queuing framework.

18. Logic encoded on one or more non-transitory computer readable media for execution and when executed operable to:
    measure application performance for application traffic received from one or more endpoints;
    optimize TCP (Transmission Control Protocol) applications and UDP (User Datagram Protocol) applications based on said measured performance and policy input;
    transmit feedback to one or more of the endpoints, said feedback configured for use by said one or more endpoints in adjusting the application traffic;
    queue the application traffic such that the application traffic for both TCP and UDP applications shares available bandwidth in accordance with said measured performance and said policy input; and
    transmit the application traffic over a wide area network.

* * * * *